(12) United States Patent
Flohr

(10) Patent No.: US 9,200,578 B2
(45) Date of Patent: Dec. 1, 2015

(54) CHARGED INTERNAL COMBUSTION ENGINE

(75) Inventor: Andreas Flohr, Friedrichshafen (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 222 days.

(21) Appl. No.: 13/578,287

(22) PCT Filed: Feb. 11, 2011

(86) PCT No.: PCT/EP2011/000662
§ 371 (c)(1),
(2), (4) Date: Sep. 12, 2012

(87) PCT Pub. No.: WO2011/098292
PCT Pub. Date: Aug. 18, 2011

(65) Prior Publication Data
US 2013/0008161 A1    Jan. 10, 2013

(30) Foreign Application Priority Data
Feb. 11, 2010 (DE) .......................... 10 2010 007 601

(51) Int. Cl.
*F02B 37/00*   (2006.01)
*F02D 41/00*   (2006.01)
*F02B 37/013*  (2006.01)
(Continued)

(52) U.S. Cl.
CPC .......... *F02D 41/0007* (2013.01); *F02B 37/001* (2013.01); *F02B 37/004* (2013.01); *F02B 37/013* (2013.01); *F02B 37/04* (2013.01); *F02B 37/16* (2013.01); *F02B 37/18* (2013.01);
(Continued)

(58) Field of Classification Search
CPC .... F02B 37/001; F02B 37/004; F02B 37/013; F02B 37/16; F02B 37/18; F02B 37/04; F02B 39/04; F02B 39/10; F02D 41/0007; Y02T 10/144
USPC ........ 60/273, 600, 612, 602, 605.1, 607–609, 60/611; 123/562
See application file for complete search history.

(56) References Cited

U.S. PATENT DOCUMENTS 3,257,797 A * 6/1966 Lieberherr ...................... 60/599
3,469,393 A * 9/1969 Tryhorn ......................... 60/609
(Continued)

FOREIGN PATENT DOCUMENTS

| JP | 55109727 A | 8/1980 |
|---|---|---|
| WO | WO-2007083131 A1 | 7/2007 |
| WO | WO-2009087274 A2 | 7/2009 |

OTHER PUBLICATIONS

PCT International Search Report dated Jun. 10, 2011 for PCT/EP2011/000662.

*Primary Examiner* — Audrey K Bradley
*Assistant Examiner* — Jason T Newton
(74) *Attorney, Agent, or Firm* — Fishman Stewart Yamaguchi PLLC

(57) ABSTRACT

A control and regulation method is described for a turbocharged internal combustion engine, in which in a high-performance range (HLB) the turbocharged air is pre-compressed via a two-stage turbocharging process. The described method comprises a low-pressure stage and a high-pressure stage and fed to the internal combustion engine and in which in a low-performance range (NLB) the turbocharged air, pre-compressed via the two-stage turbocharging process, is fed to the internal combustion engine, post-compressed via a compressor as a third turbocharging stage.

13 Claims, 3 Drawing Sheets

(51) Int. Cl.
  *F02B 37/04* (2006.01)
  *F02B 37/16* (2006.01)
  *F02B 37/18* (2006.01)
  *F02B 39/04* (2006.01)
  *F02B 39/10* (2006.01)

(52) U.S. Cl.
  CPC ............... *F02B39/04* (2013.01); *F02B 39/10* (2013.01); *Y02T 10/144* (2013.01)

(56) References Cited

U.S. PATENT DOCUMENTS

| | | | |
|---|---|---|---|
| 4,502,283 A * | 3/1985 | Wandel | 60/609 |
| 4,730,457 A * | 3/1988 | Yamada et al. | 60/609 |
| 4,903,488 A * | 2/1990 | Shibata | 60/609 |
| 5,335,500 A * | 8/1994 | Wunderlich et al. | 60/609 |
| 5,704,323 A * | 1/1998 | Gardell et al. | 123/179.3 |
| 6,112,523 A * | 9/2000 | Kamo et al. | 60/612 |
| 6,134,888 A * | 10/2000 | Zimmer et al. | 60/600 |
| 6,205,786 B1 * | 3/2001 | Hasler | 60/612 |
| 6,889,503 B2 * | 5/2005 | Hoecker et al. | 60/612 |
| 2001/0004834 A1 * | 6/2001 | Hasler | 60/612 |
| 2007/0151243 A1 | 7/2007 | Stewart | |
| 2008/0169246 A1 | 7/2008 | Japikse | |
| 2009/0000298 A1 * | 1/2009 | Barthelet | 60/608 |
| 2009/0265080 A1 * | 10/2009 | Fry et al. | 701/103 |
| 2010/0199665 A1 * | 8/2010 | Kapus | 60/602 |
| 2010/0263638 A1 * | 10/2010 | Kogo et al. | 123/562 |
| 2012/0055152 A1 * | 3/2012 | Petrovic | 60/602 |

* cited by examiner

CHARGED INTERNAL COMBUSTION ENGINE

TECHNICAL FIELD

The disclosure relates to a control and regulating method for a turbocharged internal combustion engine, in which in a high-performance range the turbocharged air is supplied via a two-stage turbocharging from a low-pressure stage as well as a high-pressure stage to the internal combustion engine in a pre-compressed fashion and in which in a low-performance range the turbocharged air, pre-compressed in two stages, is post-compressed via a compressor as a third turbocharging stage and then fed to the internal combustion engine. Furthermore, the disclosure relates to an appropriately adjusted turbocharger assembly.

BACKGROUND

An internal combustion engine is known from DE 199 05 112 A1 comprising an exhaust turbocharger, in which for improving the reaction behavior the pre-compressed turbocharged air is post-compressed by a compressor, for example a Roots compressor. A bypass valve is arranged parallel in reference to the compressor, which at low engine speeds is closed and is opened at sufficient performance of the exhaust turbocharger. It is characteristic here that with this turbocharging process only a low motor performance can be achieved, which is insufficient for example in tracked vehicles. Additionally, in a single stage turbocharging based on the nominal performance of the internal combustion engine the problem arises that the rotation of the exhaust turbocharger increases with increasing geodetic elevation due to physical circumstances. Accordingly, at great geodetic elevations the performance of the internal combustion engine must be largely reduced, as suggested for example in DE 10 2006 008 356 A1. However, it is not desired with regard to the engine performance that at a lower geodetic elevation the one-stage turbocharging process is adjusted to a lower turbocharged pressure.

SUMMARY

The disclosure describes a turbocharged internal combustion engine, which provides high engine performance independent from the geodetic elevation.

Control and adjustment methods according to the disclosure in a high-performance range are described herein. In one exemplary arrangement, turbocharged air is supplied via a two-stage turbocharging from a low-pressure stage and a high pressure stage pre-compressed to the internal combustion engine. In a low-performance range the turbocharged air, pre-compressed via the two-stage turbocharging, is post-compressed via a compressor as a third turbocharging stage and then fed to the internal combustion engine. Here, in the low-performance range the turbocharged pressure may be controlled by a deviation being calculated from the turbocharged target pressure as well as the turbocharged actual pressure, a turbine bypass valve being closed to circumvent the high-pressure turbine, and a compressor bypass valve to circumvent the compressor being controlled depending on said deviation. In the low-performance range therefore a controlled 3-stage turbocharging process occurs. In one exemplary arrangement, the high-performance range the turbocharged pressure is regulated by opening the compressor bypass valve and the turbine bypass valve to circumvent the high-pressure turbine being controlled depending on the deviation. This is equivalent to a 2-stage controlled turbocharging process. The low-performance range is defined via the idling speed of the internal combustion engine as well as the rotation limit of the compressor, while the high-performance range is defined by the rotation limit as well as a maximum speed of the internal combustion engine.

In the 2-stage controlled turbocharging process the exhaust turbochargers of the low-pressure stage and the high-pressure stage are designed such that at a nominal performance both stages are actively contributing to the turbocharging process. The capacity utilization of the components and the rotation fall drastically, thus allowing the implementation of very high motor performance even in great geodetic elevations without any reduction of performance. The design of the exhaust turbochargers of the low-pressure stage and the high-pressure stage in the above-described fashion leads to the available torque being considerably reduced at low rotations. Here, the compressor is activated as the third turbocharging stage switched serially, counteracting the reduction in performance. In addition to a high peak performance as well as high average pressure it is advantageous, here, that already at low engine speeds a rapid development of turbocharged pressure occurs and the reduction of performance due to increasing geodetic elevation is omitted.

BRIEF DESCRIPTION OF THE DRAWINGS

The figures show a preferred exemplary embodiment. More specifically.

DETAILED DESCRIPTION

Figure 1:
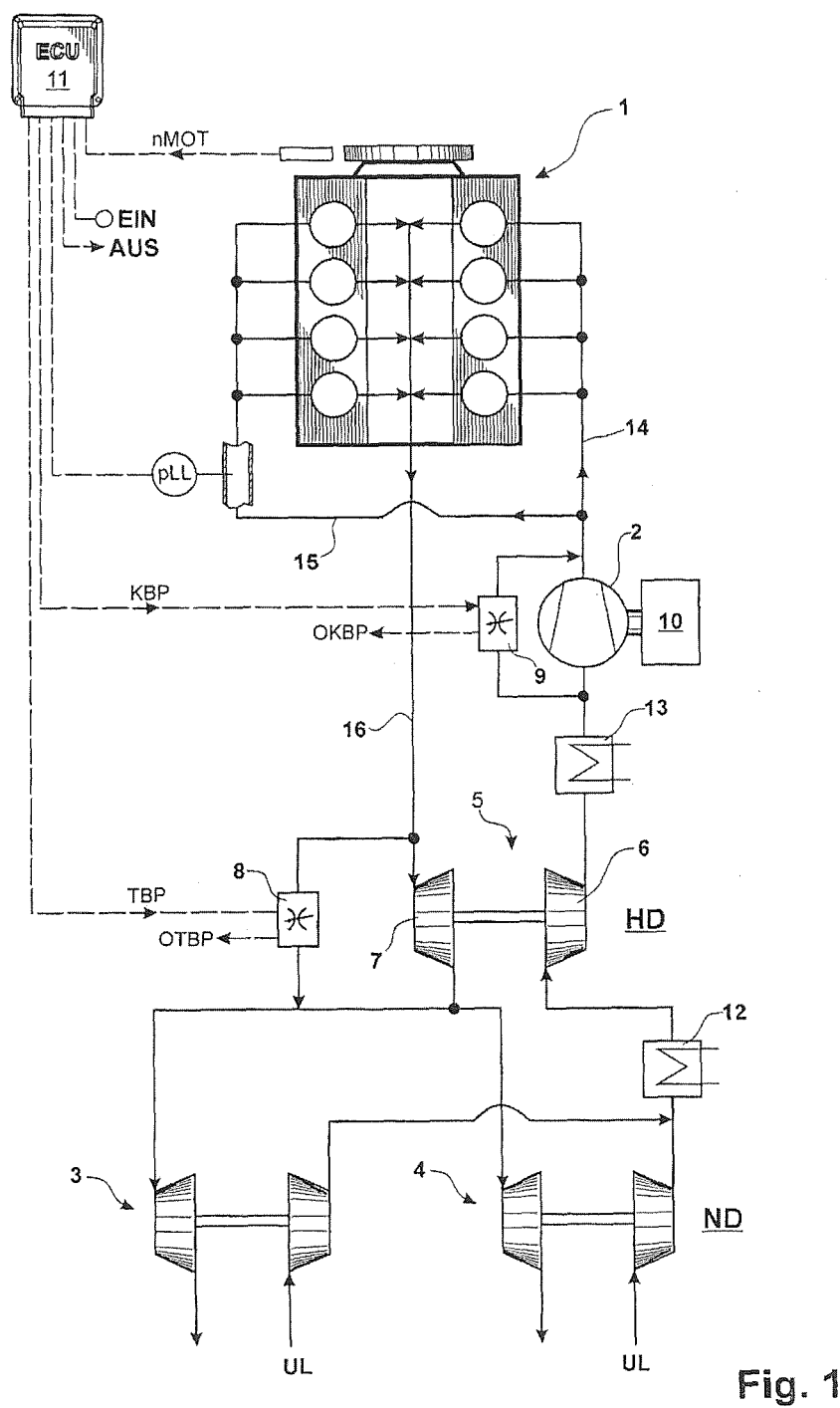
FIG. 1 is a system diagram of an exemplary arrangement.

FIG. 1 shows a system diagram of an internal combustion engine 1 with a turbocharger assembly. The turbocharger assembly comprises a low-pressure stage ND, a high-pressure stage HD, and a compressor 2. The low-pressure stage ND represents a first charging stage. The high-pressure stage HD represents a second stage, and the compressor 2 then represents a third turbocharger stage. The low-pressure stage ND comprises at least one exhaust turbocharger. In the exemplary embodiment shown the low-pressure stage ND comprises a first exhaust turbocharger 3 and a second exhaust turbocharger 4, while the high-pressure stage HD comprises only one exhaust turbocharger 5. Each exhaust turbocharger comprises a compressor to convey the turbocharged air and a turbine impinged with exhaust, for example the compressor 6 and the high-pressure turbine 7 of the high-pressure stage HD. An electrically controlled turbine-bypass valve 8 is arranged parallel in reference to the high-pressure turbine 7 of the high-pressure stage HD. Here, parallel indicates that a partial exhaust flow can pass through the high-pressure turbine 7 and a partial exhaust flow through the turbine bypass valve 8. An electrically controlled compressor bypass valve 9 is arranged parallel in reference to the compressor 2. The compressor 2 is driven by the internal combustion engine 1 via a transmission 10, for example a gear stage with a clutch.

The internal combustion engine 1 and the turbocharger assembly are controlled via an engine control unit 11 (ECU), which comprises the usual components of a micro-computer system, for example a micro-processor, I/O components, buffers, and memory components (EEPROM, RAM). In the memory components, the relevant operating data for operating the internal combustion engine 1 and the turbocharger assembly are applied. Using said data, the control device 11 calculates the output parameters from the input parameters. In FIG. 1, as an example for the input parameters of the engine control device 11, the engine speed nMOT, the turbocharged pressure pLL, and a parameter EIN are shown. The parameter EIN represents an example for the other input signals, for example the oil or fuel temperature. An opening level OKBP of the compressor bypass valve 9 and an opening level OTBP of the turbine bypass valve 8 are optional input parameters of the engine control device 11 when the two bypass valves shall be monitored. The output parameters of the electronic engine control device 11 shown are a signal KBP to control the compressor bypass valve 9, a signal TBP to control the turbine bypass valve 8, and a signal AUS. The signal AUS represents an example of the other adjustment signals to control and regulate the internal combustion engine 1, for example the start of injection/injection term of the injectors or a signal to control an interphase transformer in a common rail system.

The ambient air UL in the first turbocharging stage is compressed via the low-pressure stage ND to a first pressure level, for example ranging from 1.8 to 2.9 bar. This turbocharged air then flows through a first turbocharged air cooler 12 and is compressed in the high-pressure stage HD to a second pressure level, for example ranging from 3 to 4 bar. Subsequently the turbocharged air is cooled once more in a second turbocharged air cooler 13. When the compressor bypass valve 9 is closed, the turbocharged air is then compressed in the third compression stage via the compressor 2 (pLL>4 bar) and fed via the two turbocharged air pipes 14, 15 to the internal combustion engine 1. After the combustion process the exhaust is fed from the cylinders of the internal combustion engine 1 via an exhaust pipe 16 to the high-pressure turbine 7 of the high-pressure stage HD. With the turbine bypass valve 8 being closed the entire exhaust flow passes through the high-pressure turbine 7. Then the relaxed exhaust is guided parallel to the two turbines to the low-pressure stage ND.

The invention now provides that in a low-performance range the turbocharged air is pre-compressed via the low-pressure stage ND as well as the high-pressure stage HD and the pre-compressed turbocharged air is then post-compressed by the compressor 2 as the third turbocharging stage. This is equivalent to a 3-stage turbocharging process. In the low-performance range the turbocharger pressure pLL is controlled by calculating a deviation from the turbocharged target pressure and the turbocharged actual pressure, the turbine bypass valve 8 to circumvent the high-pressure turbine 7 is closed completely, and the compressor bypass valve 9 is addressed depending on said deviation.

In a high-performance range, the turbocharged pressure pLL is controlled by the compressor bypass valve 9 being opened completely and the turbine bypass valve 8 to circumvent the high-pressure turbine 7 being controlled depending on the deviation. This represents a 2-step controlled turbocharging process.

Figure 2:
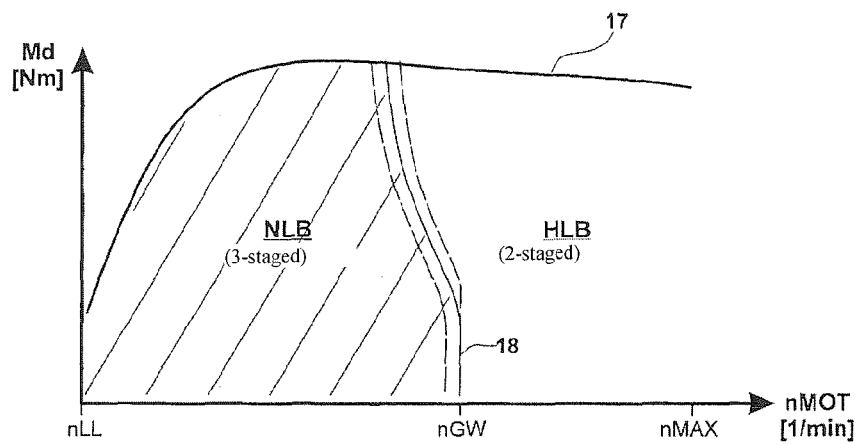
FIG. 2 is an engine map.

FIG. 2 shows an engine map with an engine speed nMOT on the abscissa and the motor momentum Md on the ordinate. The motor momentum Md is limited via a DBR curve 17, which characterizes the maximum permitted average pressure of the internal combustion engine 1. The engine map is marked hatched in the low-performance range NLB. In the low-performance range NLB the 3-stage turbocharging process is activated comprising a low-pressure stage, a high-pressure stage, and a compressor. The low-performance range NLB begins at the idling rotation nLL of the internal combustion engine 1, typically nLL=700 l/min, and ends at a limit rotation nGW, for example nGW=2500 l/min. The limit rotation nGW results from the maximum permitted rotation of the compressor, i.e., its rotation limit and the gear ratio of the transmission. In the low-performance range the turbine bypass valve is completely closed, while the compressor bypass valve is controlled depending on the deviation of the turbocharged pressure. Above a switching parameter 18, thus in the direction of an increasing engine speed nMOT, the high-performance range HLB starts. The high-performance range HLB extends to a maximum engine speed nMAX. In the high-performance range HLB the 2-stage turbocharging process comprising the low-pressure and the high-pressure stage, is activated. The compressor representing the third turbocharging stage is inactive, because the compressor bypass valve is completely open. In the high-performance range HLB the turbocharged pressure is controlled via the turbine bypass valve depending on the deviation of the turbocharged pressure. In one option it is provided that the switching parameter 18 is surrounded by a tolerance zone, in order to allow reacting to changing environmental conditions. The tolerance zone is marked in dot-dash lines in the figure.

Figure 3:
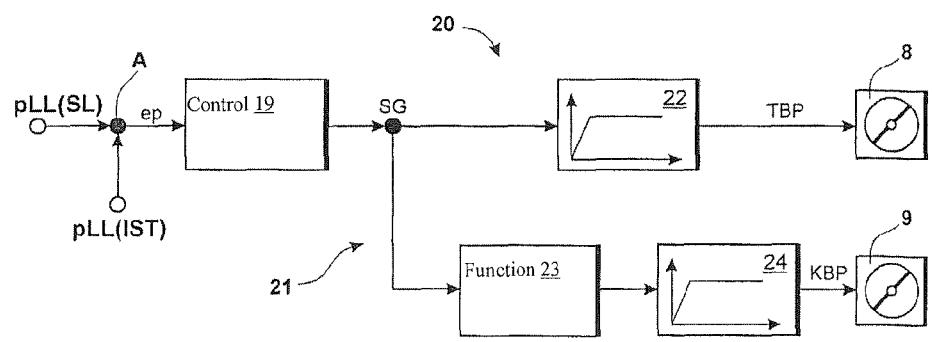
FIG. 3 is a control circuit.

FIG. 3 shows a control circuit to control the turbocharged pressure pLL. The input parameter, i.e., the relevant parameter, is the turbocharged target pressure pLL (SL). the raw values of the turbocharged pressure pLL form the output parameter of the control circuit. It is determined by a sensor in the turbocharged air pipe (FIG. 1:15), filtered via a software filter, and set as the turbocharged actual pressure pLL(IST). Then, at a summation point A the deviation ep is calculated from the target-actual deviation of the turbocharged pressure. Using the deviation ep, a turbocharged pressure control 19 determines the adjustment parameter SG with at least PI behavior. The adjustment parameter SG is fed via a first signal path 20 of a limit 22 and via a second signal path 21 to a function block 23. By the first signal path 20 the parameter SG is limited and the turbine bypass valve 8 is controlled, the control signal TBP. Via the second signal path 21 the adjustment parameter SG is further processed in the function block 23, limited via the limit 24, and the compressor bypass valve 9 is addressed, the control signal KBP. Via the function block 23 it is implemented that the turbocharged pressure control 19 can only access the compressor bypass valve 9 when the turbine bypass valve 8 is completely closed. As is clearly discernible from FIG. 3 the control of the turbocharged pressure in the 3-stage turbocharging process can be integrated in the existing turbocharging control circuit. Accordingly the simple implementation into the engine software is advantageous here.

Figure 4:
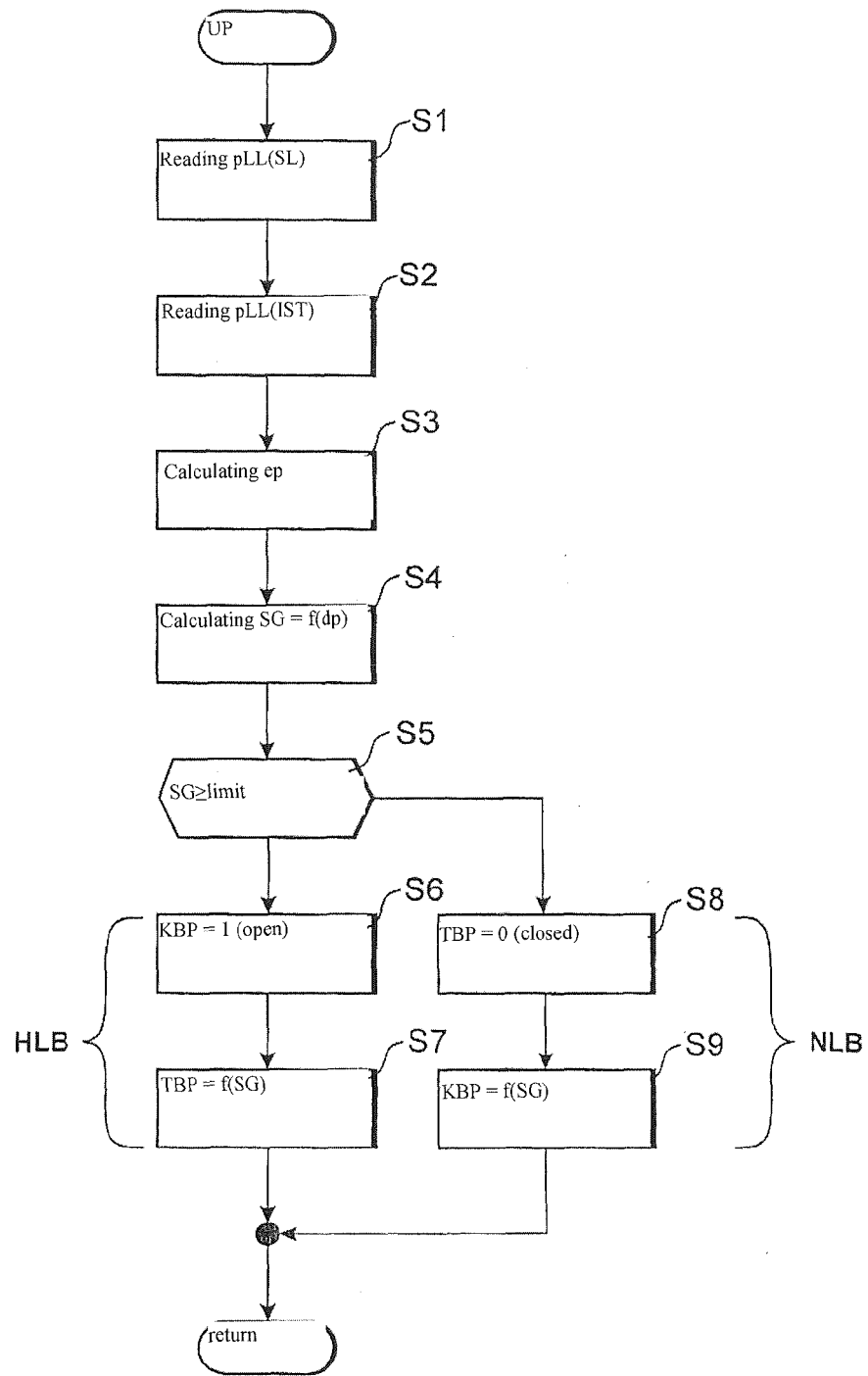
FIG. 4 is a program flow chart.

FIG. 4 shows a program flow chart of the method as a subprogram UP. At S1 the turbocharged target pressure pLL (SL) is read, which is usually calculated via a characteristics curve/characteristics zone at least depending on a performance request. Then, at S2 the turbocharged actual pressure pLL(IST) is calculated from crude values and compared at S3 with the turbocharged target value pLL(SL). This is equivalent to the deviation ep. Based on the deviation ep the turbocharged pressure control determines its adjustment parameter SG at S4. Subsequently it is checked if the control parameter SG is greater than/equal to a limit, for example 90-degree opening angle. If the control value SG is below the threshold, the inquiry result S5: no, in S6 the third turbocharging step with the compressor is deactivated, by the compressor bypass valve being completely opened by the control signal KBP. The pre-compressed turbocharged air is now fed after the high-pressure stage directly to the internal combustion engine, bypassing the compressor. In S7 then the turbine bypass valve is controlled via the control signal TBP depending on the deviation ep. This is equivalent to the high-performance range HLB with a 2-stage controlled turbocharging. Then this program path is completed and the primary program is returned to.

However, if it was found in S5 that the adjustment parameter SG was greater than/equal to the limit, inquiry result S5: yes, in S8 the turbine bypass valve is completely closed via the control signal TBP and in S9 the compressor bypass valve is regulated by the control signal KBP depending on said deviation ep. This is equivalent to the low-performance range NLB with a 3-stage controlled turbocharging process. Subsequently the primary program is returned to.

The disclosure can be varied in the following ways without changing the essence of the disclosure. The following are examples of such variations:

The compressor may also be driven by an electric engine instead of the internal combustion engine. The capacity of the compressor and thus the pressure level of the turbocharged air pLL are then determined by the rotation of the electric engine. Here, the compressor bypass valve 9 only fulfills a bypass function in the high-performance range. The electric engine is controlled by the engine control device via a PWM signal.

The compressor may partially represent an exhaust turbocharger, i.e., the mechanical or electric drive of the compressor is omitted;

Instead of the power level of the turbocharged air pLL, the air mass or the combustion air ratio can be used as the control parameter, with the air mass here then being detected at the same place as the pressure level of the turbocharged air pLL and the combustion air ratio being measured upstream in reference to the turbine of the low-pressure stage;

The control of the two bypass valves may occur via pneumatic control pressures.

The invention claimed is:

1. A method for controlling a turbocharged engine comprising first, second, and third turbocharging stages, comprising:
    determining engine operating conditions;
        during a first engine operating condition, compressing intake air for the turbocharged internal combustion engine with only two of the three stages, wherein turbocharged air is fed to the turbocharged internal combustion engine via a two-stage turbo charging process comprising the first stage, the first stage being a low-pressure stage, as well as the second stage, the second stage being a high-pressure stage, and bypassing the third stage;
        during a second engine operating condition, changing from the two-stage turbo charging process to a three-stage turbocharging process, wherein intake air for the turbocharged internal combustion engine is compressed using the first, second and third turbocharging stages, wherein the turbocharged air is pre-compressed via the two-stage turbocharging process and the pre-compressed intake air from the two-stage turbocharging process is subsequently fed to and post-compressed via the third stage, the third stage including a compressor; and
        feeding post-compressed intake air from the compressor of the third stage to the internal combustion engine.

2. The method according to claim 1, further comprising controlling the internal combustion engine at least according to an engine map, the engine map including a correlation between an engine speed and an engine torque, and operating the engine using one of the two-stage turbo charging process and the three-stage turbo charging process based at least in part upon a switching parameter on the engine map.

3. The method according to claim 1, further comprising compressing intake air using the two-stage turbo charging process at a first engine speed, and compressing intake air using the three-stage turbo charging process at a second engine speed, the second engine speed lower than the first engine speed.

4. The method according to claim 1, further comprising compressing intake air for the turbocharged internal combustion engine with all three stages in response to at least a deviation of an actual turbocharged pressure from a turbocharged target pressure, wherein a turbine bypass valve configured to circumvent a high-pressure turbine by being opened is closed, and wherein a rotation of the compressor is controlled in response to at least the deviation.

5. The method according to claim 4, further comprising monitoring an opening level of the turbine bypass valve and an opening level of the compressor bypass valve with an electronic motor control device.

6. The method according to claim 1, further comprising
    the first engine operating condition includes determining a deviation of a turbocharged actual pressure from a turbocharged target pressure
    wherein the second stage is effected by closing a turbine bypass valve configured to circumvent a high-pressure turbine when the turbine bypass valve is open, and
    wherein the third stage is bypassed by opening a compressor bypass valve to circumvent the compressor.

7. The method according to claim 6, further comprising monitoring an opening level of the turbine bypass valve and an opening level of the compressor bypass valve with an electronic motor control device.

8. The method according to claim 6, wherein changing from the two-stage turbocharging process to a three-stage turbocharging process is effected by opening the compressor bypass valve, wherein the turbine bypass valve is controlled in response to at least the deviation.

9. The method according to claim 8, further comprising:
    the second engine operating condition includes determining if an idling speed of the internal combustion engine and a limit rotation speed associated with a limit rotation of the compressor are within a predetermined range, and
    compressing intake air with all three stages when the engine is operating between the limit rotation speed and a maximum speed of the internal combustion engine.

10. A turbocharger assembly comprising:
    a first stage configured to compress intake air to create compressed first stage air;
    a second stage configured to receive compressed first stage air from the first stage, and compress the compressed first stage air to create compressed second stage air; and
    a third stage configured to receive compressed second stage air, and compress the compressed second stage air to create compressed third stage air and feed the compressed third stage air to an internal combustion engine, the third stage comprising a compressor;
    a compressor bypass valve arranged parallel in reference to the compressor such that the compressor bypass valve is configured to circumvent the compressor, and a turbine bypass valve is arranged parallel in reference to the high-pressure turbine such that the compressor bypass valve is configured to circumvent the high-pressure turbine;

wherein the turbocharger assembly is configured to compress intake air for the turbocharged internal combustion engine with only two of the three stages, wherein turbocharged air is fed to the turbocharged internal combustion engine via a two-stage turbo charging process comprising the first stage, the first stage being a low-pressure stage, as well as the second stage, the second stage being a high-pressure stage, and bypassing the third stage; and wherein the turbocharger assembly is configured to change from the two-stage turbo charging process to a three-stage turbocharging process, wherein intake air for the turbocharged internal combustion engine is compressed using three stages, wherein the turbocharged air is pre-compressed via the two-stage turbocharging process and the pre-compressed intake air from the two-stage turbocharging process is subsequently fed to and post-compressed via the third stage.

11. A turbocharger assembly according to claim 10, wherein the assembly includes an electric engine configured to drives the compressor of the third stage, wherein the turbocharger is configured such that a deviation of a turbocharged pressure from a target pressure determines a speed of the electric engine.

12. The turbocharger assembly according to claim 10, wherein the turbocharger assembly is configured such that in a low-performance range the turbine bypass valve is closed, and an opening level of the compressor bypass valve is determined from a deviation of a turbocharged pressure from a target pressure.

13. The turbocharger assembly according to claim 12, wherein the turbocharger is configured such that in a high-performance range the compressor bypass valve is completely open and an opening level of the turbine bypass valve is determined from the deviation of the turbocharged pressure from the target pressure.

* * * * *